(12) United States Patent
Deter

(10) Patent No.: US 6,281,948 B1
(45) Date of Patent: Aug. 28, 2001

(54) DEVICE FOR DEFLECTION, USE THEREOF, AND A VIDEO SYSTEM

(75) Inventor: Christhard Deter, Gera (DE)

(73) Assignee: LDT GmbH & Co. Laser-Display-Technologies KG, Gera (DE)

( * ) Notice: Subject to any disclaimer, the term of this patent is extended or adjusted under 35 U.S.C. 154(b) by 0 days.

(21) Appl. No.: 09/238,296

(22) Filed: Jan. 28, 1999

(30) Foreign Application Priority Data

Feb. 9, 1998 (DE) ................................. 198 05 111

(51) Int. Cl.[7] ................................. H04N 5/74; H04N 9/31
(52) U.S. Cl. ................. 348/744; 348/756; 348/757; 348/769; 359/245; 359/246; 359/285
(58) Field of Search ............................ 348/752, 754, 348/756, 757, 762, 769, 804, 744; 359/245, 246, 249, 259, 280, 285, 305

(56) References Cited

U.S. PATENT DOCUMENTS

| | | | |
|---|---|---|---|
| 3,746,427 | * 7/1973 | Foster | 350/161 |
| 4,435,041 | 3/1984 | Torok et al. | 359/573 |
| 4,833,528 | * 5/1989 | Kobayashi | 358/53 |
| 4,979,030 | 12/1990 | Murata | 358/56 |
| 4,992,858 | * 2/1991 | Kobayashi | 358/53 |
| 5,086,341 | * 2/1992 | Tamada et al. | 358/201 |
| 5,128,797 | * 7/1992 | Sachse et al. | 359/246 |
| 5,253,073 | 10/1993 | Crowley | 358/231 |
| 5,712,721 | * 1/1998 | Large | 359/245 |
| 5,802,222 | 9/1998 | Rasch et al. | 385/1 |
| 5,828,424 | * 10/1998 | Wallenstein | 348/760 |
| 5,883,734 | * 3/1999 | Suzuki et al. | 359/320 |
| 5,973,822 | * 10/1999 | Xu et al. | 359/308 |

FOREIGN PATENT DOCUMENTS

| | | |
|---|---|---|
| 2657723 | 6/1978 | (DE) . |
| 3340809A1 | 5/1985 | (DE) . |
| 4200374 | 7/1993 | (DE) . |
| 4324849 | 2/1995 | (DE) . |
| 1950392 | 8/1996 | (DE) . |
| 19522698 | 1/1997 | (DE) . |
| 0000104 | 12/1978 | (EP) . |
| 0361653 | 4/1990 | (EP) . |
| 0488903 | 8/1996 | (EP) . |
| 1581922 | 12/1980 | (GB) . |
| 2117529 | 10/1983 | (GB) . |
| 5421857A | 2/1979 | (JP) . |
| 6119313A | 8/1986 | (JP) . |
| 3200938A | 9/1991 | (JP) . |
| 5241207A | 9/1993 | (JP) . |
| 9002969 | 3/1990 | (WO) . |

OTHER PUBLICATIONS

* English Abstract of DE 26 57 723 A1.
* English Abstract of DE 42 00 374 A1.
* English Abstract of DE 195 22 698 A1.
* English Abstract of JP 5–241 207 A.
* English Abstract of JP 54–21 857 A.
* English Abstract of JP 61–193130 A.
* English Abstract of JP 3–200 938 A.

* cited by examiner

Primary Examiner—Reinhard J. Eisenzopf
Assistant Examiner—Brian P. Yenke
(74) Attorney, Agent, or Firm—Reed Smith LLP

(57) ABSTRACT

In a device for the deflection of a light bundle generated by a light source, wherein this device has a nonmechanical deflection device in which the light bundle enters and exits at a different angle determined by a controlling variable, which angle depends on the wavelength of every light component in the light bundle, it is provided that an optically dispersively active system is provided behind the nonmechanical deflection device in the light propagation direction, wherein the angular dispersion of this system is dependent on the angle of the light bundle entering the system, wherein the angular dispersion compensates for the wavelength dependence of the angle of the nonmechanical deflection device determined by the controlling variable.

12 Claims, 5 Drawing Sheets

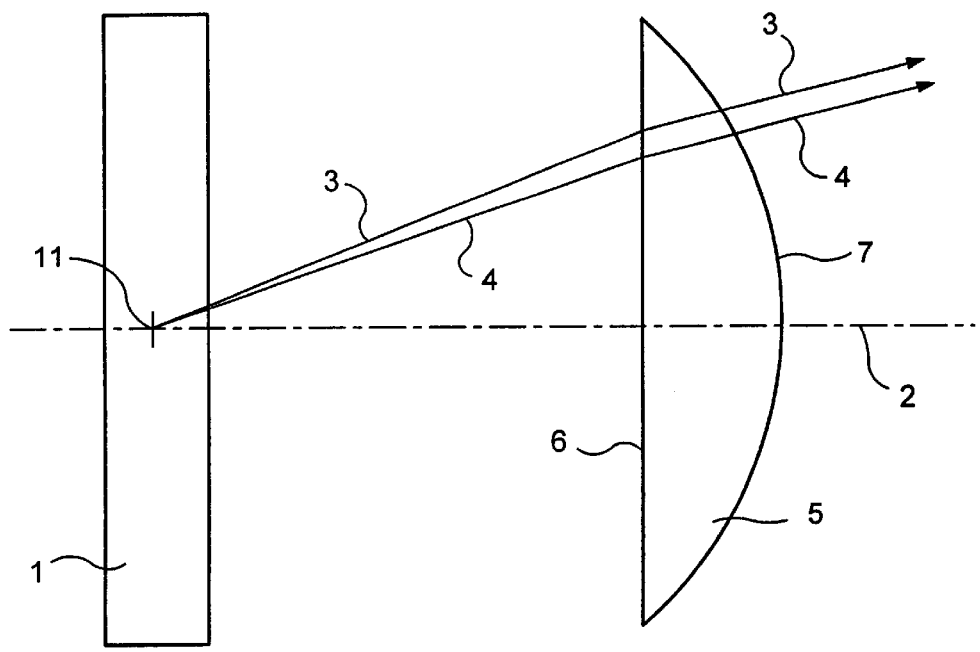
F I G. 1
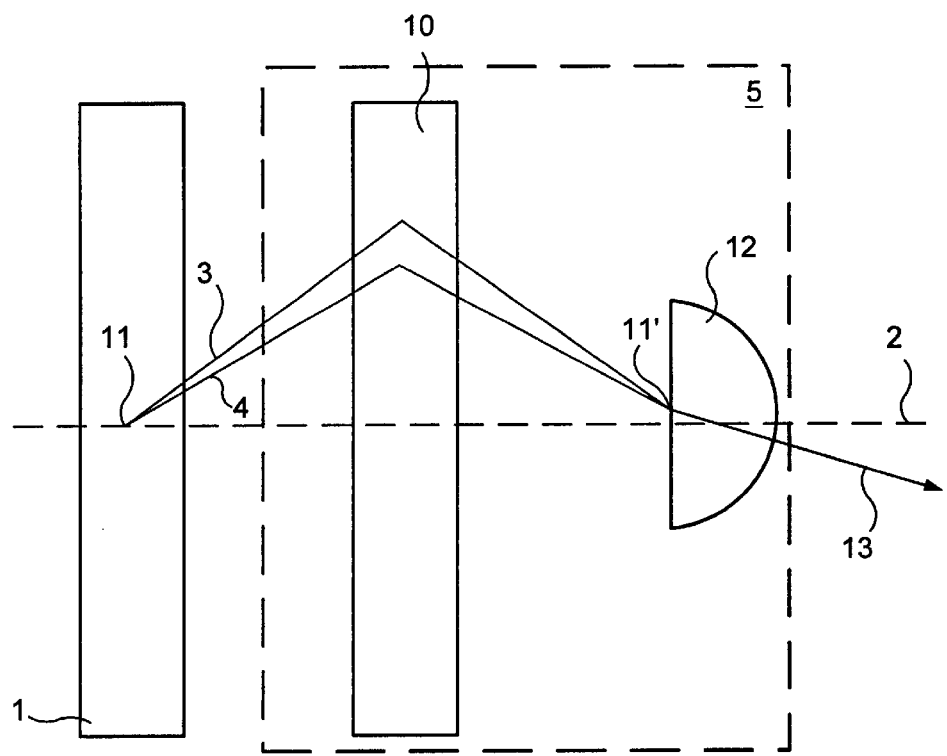
F I G. 2

DEVICE FOR DEFLECTION, USE THEREOF, AND A VIDEO SYSTEM

BACKGROUND OF THE INVENTION a) Field of the Invention

The invention is directed to a device for the deflection of a light bundle generated by a light source, wherein this device has a nonmechanical deflection device in which the light bundle enters and exits at a different angle determined by a controlling variable, which angle depends on the wavelength of every light component in the light bundle. The invention is further directed to a use of this device and to a video system in which this device is used for deflection.

b) Description of the Related Art

Devices for the deflection of a light bundle are known particularly from laser printers. In laser printers, a light-sensitive roller or drum is written on by a light beam which is electrically charged at the locations illuminated in this way, so that toner material is deposited at these locations and is subsequently transferred to paper. The writing light beam is deflected line by line for this purpose. Electro-optic and acousto-optic deflection devices have proven especially economical for this purpose and also enable high deflection frequencies up to the gigahertz range.

In video technology, in order to display color video images as is known, for example, from DE 43 24 849 C2, a light bundle is also deflected, although in two directions. The deflected light bundle illuminates sequentially on a screen the individual image points of the video image to be displayed.

In order to show color video images, the laser light bundle is usually composed of three light bundles of different colors. However, this combined light bundle cannot easily be deflected by means of an acousto-optic deflector as is known from printing technology, because its deflection angle is wavelength-dependent, which results in a separation of colors of the total light bundle.

Therefore, mechanical deflection systems are used as a rule in video technique. In this connection, line deflection, for which high deflection frequencies are required above all, is usually carried out by a polygon mirror which has different mirror faces arranged as the sides of a polygon and which is operated at rotational frequencies in the kilohertz range. With 25 mirror facets and a rotating frequency of the polygon mirror of 1.3 kHz, a horizontal deflection frequency of 32.5 kHz is achieved.

Costly technology is required to provide polygon mirrors with high rates of rotation and the required precision accompanied by high dependability and long life. In general, the cost of such mirrors is very high and they are therefore poorly suited to mass production.

Another basic disadvantage consists in the limited deflection speed. The technical limit is currently approximately 32 kHz deflection frequency. For areas of application in the above-mentioned video technology when used for CAD in simulators or in electronic cinema, a multiple of this deflection speed is required. Such systems can be realized only at a high technical expenditure and it is to be expected that the costs for this purpose will multiply compared with conventional polygon mirrors.

On the other hand, nonmechanical deflection devices which make use of electronic, magnetic or acousto-optic effects, for example, or virtual gratings in accordance with DE 44 04 118 C2 are extremely expensive. However, because of their dispersion, i.e., the dependence of the deflection angle on the wavelength of the light bundle, they are generally not suitable for imaging color pictures. For the various possibilities of nonmechanical deflection devices, reference is had by way of example to the book "Der Laser in der Druckindustrie [The Laser in the Printing Industry"], W. Hülsbusch, Constance, Verlag W. Hülsbusch, 1990; Chapter 2.3.

However, it is proposed in U.S. Pat. No. 5,253,073 for the generation of light bundles of different colors which are combined to form a total light bundle to use pulsed lasers whose light pulses pass successively through an acousto-optic deflector which is used as a deflection device and which is then acted upon by different switching frequencies as controlling variables for the respective light pulse located in the deflector.

The switching speed of acousto-optic deflectors of this type depends, however, on the speed of sound in the acousto-optically active material and on the diameter of the light bundle. Because of the limitation due to the velocity of sound, switching speeds in the order of magnitude of several microseconds are achieved when quickly switching from one color to the other at the same deflection angle for the different frequency-dependent controlling variables in the so-called random access mode which is used in this case. This time period is not sufficient for fast changing of picture points according to conventional video standards.

The advantage of the high deflection speed made possible by acousto-optic deflectors with uniform deflection can therefore not be utilized, so that polygon mirrors and galvanometer mirrors must continue to be relied on for deflection of the light bundle for video systems of the type mentioned above.

OBJECT AND SUMMARY OF THE INVENTION

It is the primary object of the invention to provide a device for the deflection of a light bundle which also allows deflection of light bundles with components having a plurality of colors which is, however, superior to polygon mirrors with respect to cost and speed.

Based on the prior art mentioned above, this object is met in that an optically dispersively active system is provided behind the nonmechanical deflection device in the light propagation direction, wherein the angular dispersion of this system is dependent on the angle of the light bundle entering the system, wherein the angular dispersion compensates for the wavelength dependence of the angle of the nonmechanical deflection device determined by the controlling variable.

Surprisingly, nonmechanical deflection devices such as acousto-optic deflectors or deflection devices based on electro-optic or magneto-optic effects as well as virtual gratings can also be used for the purpose of deflecting a total light bundle comprising a plurality of wavelengths. For this purpose, an optically dispersively acting system is arranged behind the deflection device. This system is configured to the angular dispersion occurring in the utilized nonmechanical deflection device, specifically, with the opposite mathematical sign of the dispersion angle so that the angular dispersion of the deflection device and that of the dispersively acting system compensate for one another.

Dispersively active systems have been known for a long time, but only in connection with conventional optical imaging. The achromatism condition is achieved only in the actual image plane.

A prism or a lens, for example, generally has a dispersion due to the glass that is used. Therefore, the dispersively active system used according to the invention can be formed, for example, by the shaping of a glass body and the selection of glass therefor in such a way that the angular dispersion is compensated for every incident angle of the nonmechanical deflection system.

The design of conventional optically dispersively active systems of the type mentioned above is known. For example, systems with lenses whose dispersion effects cancel each other out and can be determined by suitable optics design programs are known in photographic objectives. Objectives of this type are achromatic or apochromatic depending on how many wavelengths the dispersion is to be compensated for. However, it is not possible in this connection to meet the achromatism condition on the image side in both the far field and near field.

In general, a plurality of parallel light bundles of different colors which are spaced apart are obtained in the output beam when carrying out angle compensation by means of an individual, suitably shaped glass body for an input light bundle having light of different wavelengths. This is generally not a problem in a video projection device because each of the parallel light bundles of different colors, although directed to a different line, can nevertheless display the image in correct color when the intensity modulation of the input light bundles of the individual color components is configured to the respective line to be written. However, in this case, additional lines must be provided at the upper and lower edges of the image in a video projection device.

In an advantageous further development, it is provided that the light source has at least three lasers for generating at least three light bundles having a different centroid wavelength which are combined to form a total light bundle which exits collinearly from the light source, and in that the optically dispersively active system is configured for a collinear total light bundle proceeding therefrom for correcting with respect to the three centroid wavelengths.

The expression collinear as used herein does not refer to an exact geometric collinearity. For the required collinearity of concern in this connection, it is sufficient that there is agreement between the points of incidence on the screen within a picture point size or within the beam diameter of a light bundle of a given color.

Every light source, including a laser, always has a spectrum, that is, a distribution of different wavelengths. The center wavelength of the distribution is defined as the centroid wavelength.

In accordance with the further development, both the exiting light bundle and the input light bundle are collinear. This is achieved by means of the special design of the optically dispersively active system, for example, by means of optical design programs. The device according to the further development makes it possible to control every image point of a video image with respect to color and intensity simultaneously.

Further, the optically dispersively active system is corrected with respect to its wavelengths on three lasers for image generation so as to enable optimum overlapping or coverage in angle and position for displaying images.

It has been shown that good color video images can be displayed even when the optically dispersively active system is configured to only two extreme wavelengths, since small color displacements are barely detectable based on the resolution of the human eye. However, configuration based on three centroid wavelengths advantageously results in a resolution which is good enough that a high-quality television image can also be obtained close to the screen.

In addition to other possibilities, several of which will be described in subsequent embodiment examples, an optically dispersively active system of the type mentioned above can advantageously be constructed according to a further development of the invention in such a way that a lens system is provided with an input-side focal point and output-side focal point, a light bundle traversing the input-side focal point also passes through the output-side focal point, and the input-side focal point lies in the deflection point of the nonmechanical deflection device, wherein at least two light bundles of different wavelengths exit from the lens system in an identical location of the final lens system depending on the controlling variable.

While the optically dispersively active systems mentioned above can also be constructed from components other than lenses, it has been shown that the above-mentioned construction as a lens system is especially simple to carry out. This simplification is due above all to the fact that a dispersively acting optical system of the type mentioned above can be designed in a known manner with conventional optics programs taking into account the given color correction, the position of the focal points, and the location on the final lens vertex. Further, in contrast to other possibilities which, for example, use a second dispersive deflection system to compensate for the angular dispersions, for example, electronic components for controlling the compensating dispersively acting optical system, such as is needed in an embodiment example which will be shown subsequently, can be dispensed with in the further development mentioned above.

The deflection angles of nonmechanical deflection devices are normally in the millirad range. A small deflection angle of this kind is generally not advisable for a video image because a very great distance would have to be provided between the laser projector and screen for a suitable image size. In order to reduce the large distance between the projector and screen which would be required in this case, mirror systems or other special expansion optics have been proposed in the literature.

According to a preferred further development of the invention, however, the deflection angle can also be increased in that the lens system itself is designed for increasing the deflection angle.

Also, as regards this further development, corresponding optics can be designed with optical design programs to compensate for the corresponding dispersion and to generate an increase in the deflection angle. Generally, optical components are economized as a result of this further development, so that the cost of the video system mentioned above by way of example is reduced.

On the other hand, if priority is given to a reduction in cost through a standardizing of components for various applications rather than to a reduction in cost through a system suitable for compensation as well as expansion, the lens system which carries out both compensation and enlargement, according to a preferable further development of the invention, can also have compensation optics and expansion optics which are arranged following the compensation optics and corrected for chromatic aberrations.

In this case, a functional separation is carried out in that compensation optics for compensating the angle-dependent dispersion and expansion optics for increasing the deflection angle are both provided. In this case, when the achievable angular expansion is to be changed, because of other projection aconsiderations, by exchanging the expansion optics it is possible to retain the same compensation optics. This further development also makes it possible to use a variable-focus system, or vario-system, for the expansion optics following the compensation optics for using a video system under a wide variety of projection conditions.

According to another preferred further development, the nonmechanical deflection device is an acousto-optic deflector. An acousto-optic deflector differs from other deflection devices such as magneto-optic or electro-optic deflection devices, for example, primarily through the low price and low expenditure required for control because its control voltages are in the lower voltage range.

Acousto-optic deflectors of the kind mentioned above work according to the following principle: A sound wave is introduced into a material, wherein the density variations of the sound wave in the material lead to changes in the index of refraction which, in turn, act as a diffraction grating for a traversing light beam, so that an angular deflection occurs through diffraction in dependence on the wavelength of the sound wave. Acousto-optic deflectors of this kind can be constructed in different ways, wherein different diffraction conditions can be utilized. In one possible construction, the Bragg cell, as it is called, the deflected light bundle is coupled out in a quadrant adjacent to the quadrant in which it is coupled in at virtually the same angle as that at which it was coupled in.

In a preferred further development of the invention, the acousto-optic deflector is a Bragg cell. In a Bragg cell, almost the total incident light output is diffracted in a beam of the first order of diffraction, so that over 40% of the incident light output in the output light beam can be available.

In a particularly advantageous further development of the invention, it is provided that the optically dispersively active system has an output-side focal point lying outside of the system, wherein the light bundle deflected by the nonmechanical deflection device traverses this focal point, and another deflection device is arranged with a deflection point in this focal point, wherein this other deflection device deflects at a determined angle in the direction vertical to the deflection caused by the controlling variable.

With a device of the type mentioned above, a video system can be constructed in a particularly advantageous manner. A disadvantage in conventional video systems was that different points of origin were provided for the two deflection devices due to the deflection by means of a polygon mirror and a galvanometer mirror which deflected in directions perpendicular to one another. This disadvantage affects, above all, optical systems that are arranged subsequent thereto, for example, expansion optics, since, in this case, a spatially broadly expanded entrance pupil is required for these expansion optics which makes it difficult to optimize the expansion optics.

Due to the fact that the additional deflection device according to the further development is arranged at the focal point of the dispersively active system, the light bundle is deflected by the nonmechanical deflection device proceeding from the same point that can be used as an entrance pupil for subsequent expansion optics. Apart from its compensation characteristics, the optically dispersively active system acts as a relay lens system for displacing the deflection point.

As an additional deflection device, the device according to the invention can be used with a nonmechanical deflection device followed by an optically dispersively active system. This would be advantageous above all for video images which require a particularly fast line scanning. At relatively low line frequencies in accordance with conventional television standards, a moving mirror is provided as additional deflection device in accordance with a preferred further development of the invention for reasons of economy. For example, a simple galvanometer mirror with sawtooth-shaped driving is suitable for this purpose.

As will be shown in several embodiment examples described hereinafter, two devices according to the invention can also be used for the two perpendicular deflections in a video projection system. However, the expansion optics between the nonmechanical deflection devices are dispensed with in this case and, according to a preferred further development of the invention, expansion optics are only arranged subsequent to the second deflection device.

A particularly favorable deflection device for two directions, as is required for video devices, for example, is characterized according to an advantageous further development in that the nonmechanical deflection device is an individual acousto-optic deflector which is acted upon in two directions orthogonal to one another by sound waves for deflection in two directions.

The cost in this case is minimal, since only one individual optically dispersively active system and one individual acousto-optic deflector need to be used.

As was already made clear in the preceding, the invention is also directed primarily to a use of a device for deflection in the manner mentioned above or in further developments thereof in a video system by which a video image is shown by sequential illumination of image points by means of a deflected laser light bundle.

However, in a video system the intensity in nonmechanical deflection devices, for example, acousto-optic deflectors, can vary depending on the deflection angle; that is, an intensity attenuation dependent on the deflection angle can occur. This is compensated in a video system in a particularly favorable manner according to an advantageous further development of the invention in that the light source is connected to a control device by which the light source is controlled at every point in time with respect to the intensity and color of every image point, and in that signals are supplied to this control device for controlling the deflection angle depending on the controlling variable, wherein these signals are taken into account by the control device during the attenuation of intensity in dependence on the deflection angle by the nonmechanical deflection device for controlling every image point with respect to correct color and intensity to compensate for this attenuation.

This solution is remarkable for its special simplicity, since the control device used for intensity and color is the same control device that is used in a video system in any case. In this respect, it is provided that the control device according to the further development also takes into account signals which control the deflection. For example, the signals can be distorted by a nonlinear characteristic or can be digitally converted via a ROM, so that new signals are generated to counter the attenuation. The signals for compensation of the color attenuation and intensity attenuation dependent on the deflection angle can be valuated based on multiplication by the rest of the modulation signals by means of a multiplication circuit of known construction in the case of analog signals or by multiplication in a signal processor in the case of digital signals.

The invention will be described more fully hereinafter with reference to embodiment examples in connection with the drawing.

BRIEF DESCRIPTION OF THE DRAWINGS

In the drawings:

FIG. 1 shows a schematic view for illustrating the principle of compensation of the dispersion of a nonmechanical deflection device with an optically dispersively active optical system;

FIG. 2 shows an embodiment example similar to that in FIG. 1 for generating an exiting parallel light bundle of different colors;

DESCRIPTION OF THE PREFERRED EMBODIMENTS

Figure 3:
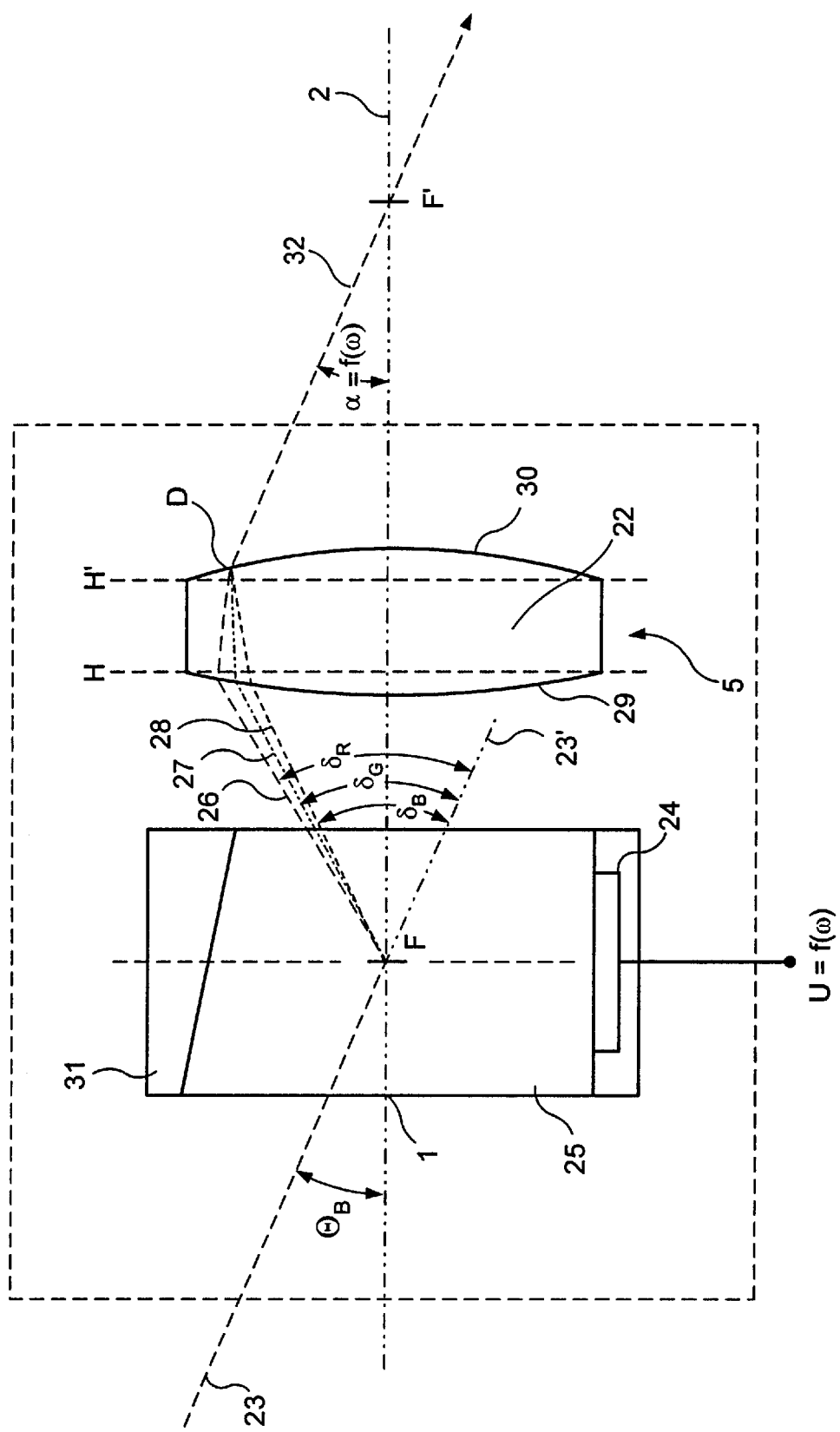
FIG. 3 shows an embodiment example with a lens system, shown schematically, serving as dispersively active optical system.

In the following embodiment examples, acousto-optic deflectors 1 have been used as nonmechanical deflection devices in all cases, although other nonmechanical deflection devices such as electro-optic or magneto-optic deflection devices may also be used. Acousto-optic deflectors are given preference in the present case only because they can be acquired cheaply and have reached technical maturity. In particular, an acousto-optic deflector AA DP-150 manufactured by A.A. s.a., 6–8 rue de Versailles, F-7870 Saint-Remy-les-Chevreuse, was selected for the embodiment examples. In addition, the AA DTS-XY/250 type, manufactured by the same firm, was used for deflection in two directions according to FIG. 4.

These acousto-optic deflectors are optimized for a deflection in the wave range of 0.488 to 0.633 μm and were operated for Bragg conditions in the deflection at a frequency of 135 MHZ for zero output deflection angle. The modulation bandwidth for the deflection was ±24 MHZ. Accordingly, it was possible to achieve a maximum deflection angle of 48 millirads at a laser wavelength of 633 nm.

As regards the manner of operation of acousto-optic deflectors, reference is had to the pertinent literature. For present purposes, it is important only that a sound wave whose wavelength determines the deflection angle is introduced into the material for the adjustment of a determined deflection angle. In so doing, the light with a shorter wavelength is deflected less strongly than the light having the longer wavelength. FIG. 1 shows a blue light bundle and a red light bundle 3 and 4, wherein the blue light bundle 4 has the shorter wavelength and is deflected less strongly.

In order to compensate for different deflection angles, the acousto-optic deflector 1 is followed by a dispersively active optical system 5 which parallelizes the light bundles 3 and 4 because the material of the system 5 has a higher index of refraction for the blue light bundle 4 than for the red light bundle 3. In addition to the index of refraction, the action of the optical system 5 is also highly dependent on the shape of surfaces 6 and 7 which can be designed in accordance with known calculating methods for parallelization for all deflection angles.

The light bundles 3 and 4 shown by way of example in FIG. 1 are parallelized in the optical system 5 in the present configuration at the indicated angle in that the light bundle 3 impinges at the surface 6 at a greater angle, but is diffracted less strongly than light bundle 4. It can also be seen from FIG. 1 that the splitting of the red beam and blue beam during deflection by the acousto-optic deflector 1 due to different curvatures of the surfaces 6 and 7 can always be suitably compensated, wherein different refractions at the surface 7 can also be taken into account. Designs of this type are known from optics and will not be discussed in more detail herein. However, the illustrated principle is applicable in all dispersively active optical systems. In particular, reference is had in this regard to the following description referring to FIG. 6 in which an explicitly calculated optical lens system is indicated which can be used in an advantageous manner in video projectors.

The embodiment example of FIG. 1 is not absolutely expedient in video projection by means of light bundles, since it would be advantageous for this purpose if the light bundles 3 and 4 were not only parallel but also collinear upon exiting the optical system, so that every image point is illuminated simultaneously by all three colors so that the exiting light bundle would be scanned as a common light bundle synchronously and uniformly over the screen.

An example for a dispersively active optical system of this kind is shown schematically in FIG. 2.

According to FIG. 2, the dispersively active optical system 5 comprises deflecting optics 10 by which the deflected light bundles 3 and 4 which exit from the deflection device 1, virtually coming from deflection point 11, are combined on a point 11' and are subsequently parallelized by a body 12 made from optically dispersive material, so that the two light bundles 3 and 4, although having different wavelengths, exit as a collinear beam 13 after combining in point 11'.

The deflecting optics 10 can be another acousto-optic deflector which is operated at half the sound wavelength of the acousto-optic deflector 1. The light bundles 3 and 4 are then focussed at every deflection angle in point 11' which therefore appears as a mirror image of the deflection point 11 in the acousto-optic deflector 1.

The body 12 is similar to the dispersively active optical system 5 according to FIG. 1 for parallelizing.

Instead of an acousto-optic deflector 10, relay optics of known construction can also be utilized because of the manner of operation of the mirroring of the light bundles 3, 4 of point 11 in point 11' for carrying out the example of FIG. 2. Another possibility consists in making use of the diffraction because this acts in the same way as the acousto-optic deflector, mentioned by way of example, as device 10. For example, the device 10 could then be a hologram or binary optics in which the diffraction pattern for deflection is calculated as a function of the site of impingement of the light bundles 3 and 4 on the hologram or the binary optics.

However, the dispersively active optical system 5 can be realized most easily with standard components such as lenses and/or mirrors, wherein the device 10 is, for example, a relay lens system or a mirror system by which deflection point 11 is imaged in point 11'.

In the embodiment example of FIG. 3, another type of dispersively active optical system 5 having the same characteristic as that of FIG. 2, namely a light bundle 23 which is unified in a collinear and parallel manner from three light bundles having the colors red, green and blue, is used to change into a collinear and parallel output light bundle 32 again after deflection via an acousto-optic deflector 1.

According to FIG. 3, the light bundle 23 enters the acousto-optic deflector 1 at the Bragg angle $\theta_B$, as it is called. For deflection, an electrical a.c. voltage is applied to a piezo-crystal 24 which, due to the vibrations which are excited therein in this way, generates a sound wave in the acousto-optic medium 25, wherein this sound wave is then absorbed in an absorber 31. The sound wave causes thickening and thinning within the acousto-optic medium 25 which lead to local changes in the index of refraction. The acousto-optic medium 25 forms a diffraction grating based on the thickening and thinning. This means that, in addition to a light bundle 23' that is not diffracted, diffracted beams 26, 27, 28 also occur. Their angles $\delta_B$, $\delta_G$, $\delta_R$ for the red, green and blue partial beams are shown in FIG. 3. Because of the deflection due to diffraction, it is also understandable that the deflection angles depend on the wavelength of the light bundles, wherein light with the longest wavelength (red) is allotted the largest deflection angle and the light with the shortest wavelength (blue) receives the smallest deflection angle.

Further, it is understandable based on the operation explained above that the deflection angles $\delta_B$, $\delta_G$, $\delta_R$ are determined by the wavelength of the sound wave and accordingly by the frequency ω of the applied intermediate voltage U.

Figure 6:
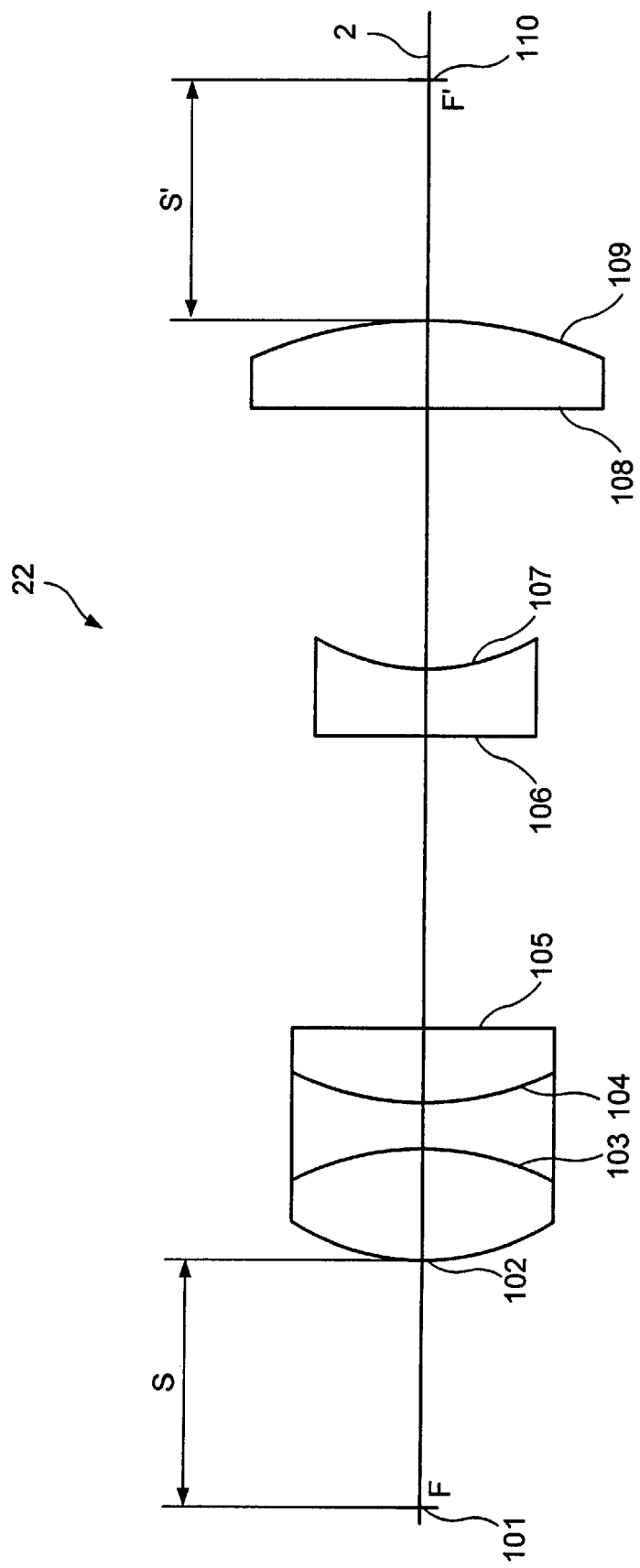
FIG. 6 shows compensation optics which are optimized with respect to three laser wavelengths and used in the embodiment examples of FIGS. 3 to 5.

The compensation optics 22, whose construction is illustrated more fully in an accompanying table and in FIG. 6, is constructed as a lens system which changes the partial beams proceeding from a focal point F into an output focal point F' independent from the wavelengths given in the beam 23. Further, the optical system 5 is dimensioned in such a way that the dispersive materials acting in the compensation optics 22 conduct the different partial light bundles 26, 27, 28 to a location D located on a final lens vertex of the compensation optics 22, wherein this location D varies with the deflection angle a. In this way, the exiting light bundle 32 is always collinear and parallel when the focal point F lies in the deflection point of the acousto-optic deflector 1.

The embodiment example of FIG. 3 can be used in an extremely advantageous manner in video projection devices because of the exiting collinear light bundle. However, only deflections in one direction can be generated with the embodiment example in FIG. 3. However, deflection in two directions as is usually used for displacing video images can be achieved with the embodiment example of FIG. 3 when, for example, another sound wave is introduced into the acousto-optically active medium 25, for example, vertical to the drawing plane, for an additional deflection. The deflection can be controlled in two orthogonal directions with the control shown in the drawing and by means of another a.c. voltage U' with another frequency, wherein the compensation optics 22 are designed as a lens system in such a way that they compensate for dispersion also for this direction through the deflector 1.

Figure 4:
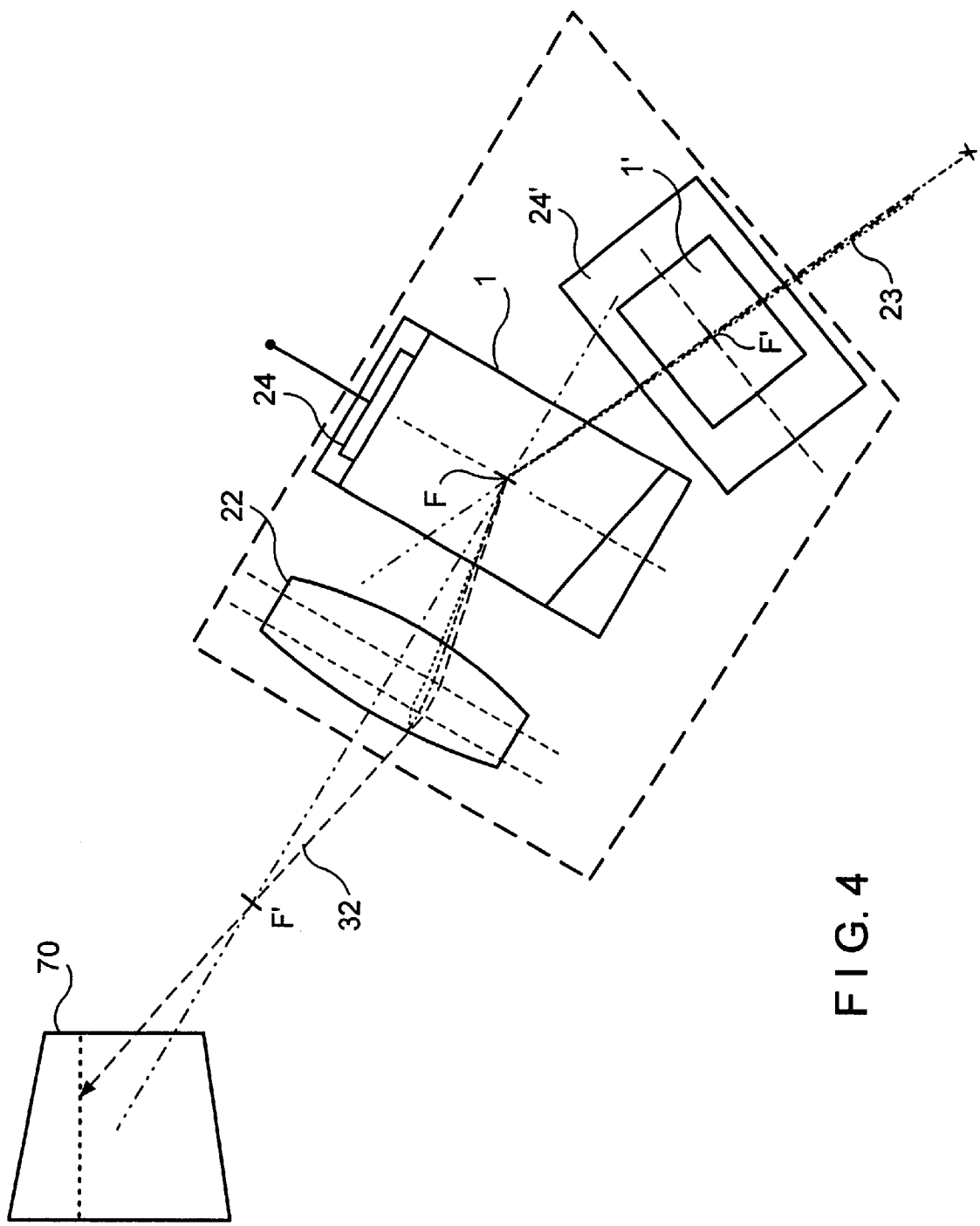
FIG. 4 shows a deflection device for deflection in two orthogonal directions.

Another possibility for two-dimensional imaging would be to arrange in succession two deflection devices, according to FIG. 3, with deflection devices vertical to one another. However, this would involve a great deal of effort, since two compensating optical systems 22 as well as two acousto-optic deflectors 1 would have to be used. Another example for a two-dimensional deflection device is shown in FIG. 4, wherein individual compensation optics 22 with two acousto-optic deflectors 1 and 1' are used. The acousto-optic deflectors 1 and 1' are arranged in a vertical direction relative to one another with respect to their deflections. Further, the compensation optics 22 do not act in a radially symmetric manner; rather their lenses are ground differently for the deflection of acousto-optic deflector 1 and acousto-optic deflector 1', so that deflection is carried out from their respective deflection points F into the individual focal point F'. Further, FIG. 4 shows a screen 70 on which the light bundle 32 is deflected and on which a video image is displayed by sequential illumination of image points.

Figure 5:
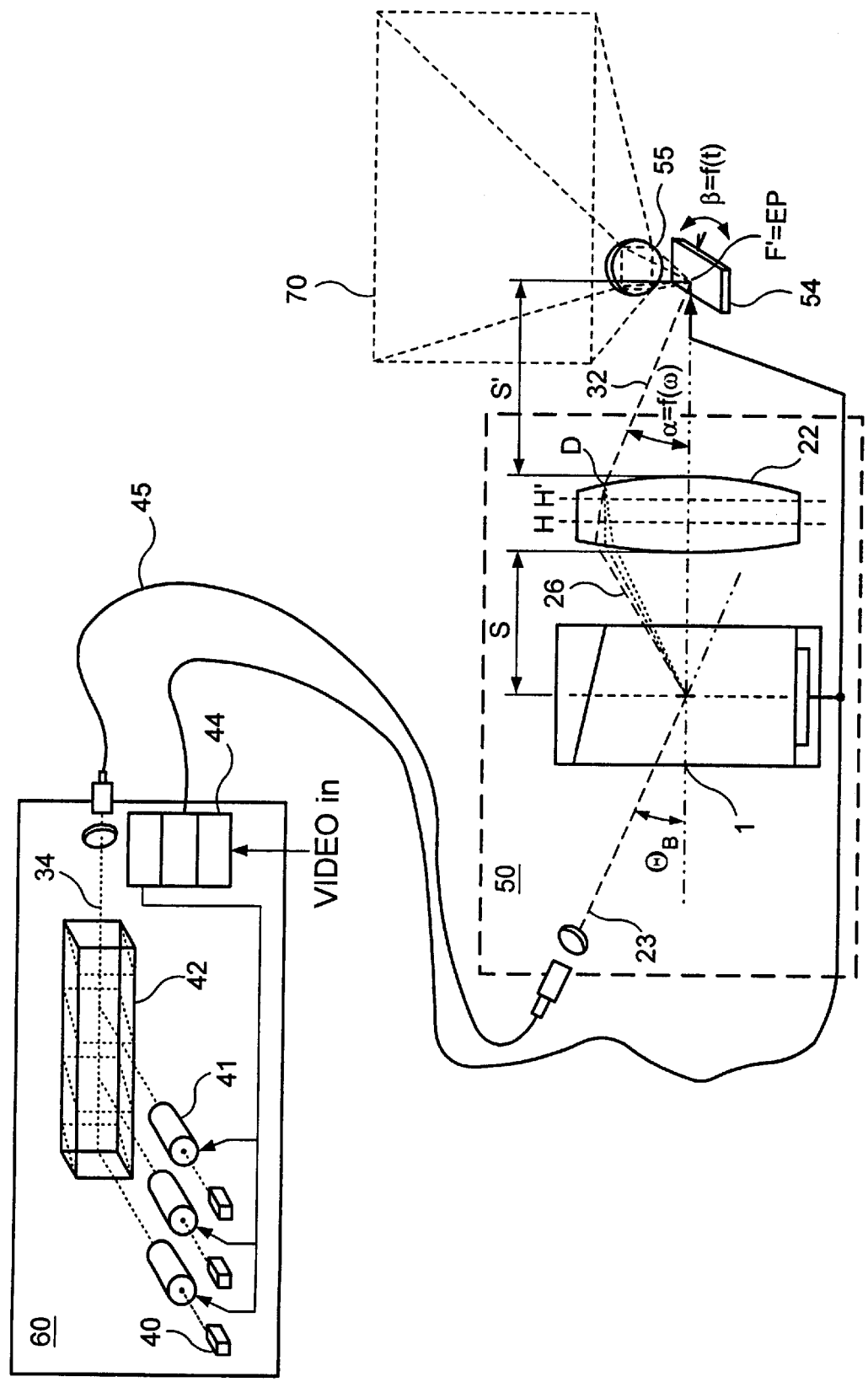
FIG. 5 show a video system in which the device of FIG. 3 is used for deflection.

The basic construction of a video system is shown in FIG. 5. A light source 60 has three lasers 40 of different colors which are controlled with respect to intensity by means of modulators 41. The three laser light bundles having the colors red, green and blue proceeding from lasers 40 are combined in a device 42 to form an individual total light bundle 34. In the embodiment example, this device 42 is formed by a dichroic mirror system as is known from the prior art.

The intensities of the laser light bundles with the three colors red, green and blue and the modulation thereof are controlled by electric signals which are generated by a control device 44 from a "VIDEO in" signal. The control device 44 also supplies the rest of the devices with the corresponding signals. For example, as is indicated at a line leading out of the light source 60, the signals required for the deflection are also obtained from the "VIDEO in" signal by this device 44. The control device 44 can accordingly also compensate for possible angle-dependent attenuations of the deflection device 1 as was described above.

The parallel and collinear total light bundle exiting from the device 42 is coupled into a light-conducting fiber 45 with optics and is coupled out again by additional optics as a collinear and parallel light bundle 23. The optics advisably required for coupling into and out of the light-conducting fiber are described in detail, for example, in DE 196 16 843 A1.

The following deflection device 50 is constructed in the same manner as the embodiment example of FIG. 3. However, a substantial difference consists in that the light bundle 32 is directed to a swivel mirror 54 after exiting the deflection device 50 by means of which, in this embodiment example, a deflection is carried out vertical to the deflection direction of the deflection device 50. While the deflection device 50 scans the light bundle 34 along a line of a video image, the swiveling mirror 54 provides for scanning in the other dimension vertical to the line direction.

The output-side focal point F' of the compensation optics 22 lies on the axis of the swiveling mirror 54. For this reason, the line deflection as well as the other deflection vertical to the line always proceeds from an individual point F' of the swiveling mirror for projection.

This characteristic signifies a substantial simplification for expansion optics 55 which are arranged subsequently for an enlargement of the scanned angle. Expansion optics 55 are described, for example, in DE 43 24 849C2, wherein the set of problems pertaining to the imaging of two deflection points at a distance from one another is addressed. The compensation optics 22 described with reference to FIG. 3 with their characteristic of shifting a deflection point F into another point F' which then advisably lies in the entrance pupil of the expansion optics 55 represents a considerable advantage over the design of the expansion optics 55 known from the prior art in that the focal points of two partial lens systems can then lie exactly on top of one another.

FIG. 6 shows compensation optics which were designed for a video projection device of the type mentioned above, wherein the wavelengths of the lasers 40 had the following values: $\lambda_R$=620 nm for red light, $\lambda_G$=540.5 nm for green light and $\lambda_B$=476 nm for blue light.

With respect to the dimensioning of the embodiment example of FIG. 6, a table lists the radii of curvature of the individual lenses, their distance from the next surface, refraction indexes and dispersion, which is expressed in the present case by the Abbe number v, which allows a simple duplication of the compensation optics 22 according to the invention for a video projection device. Reference numbers 101 to 110 designate specific locations of lens surfaces and focal points F, F' which are given in the table in the "Location" column.

Modifications familiar to those skilled in the art for the embodiment examples shown herein are not mentioned in particular. For example, the expansion optics 55 in the embodiment example in FIG. 5 can be omitted when the compensation optics 22 are designed so as not only to compensate but also to enlarge the angle simultaneously.

Other changes in the illustrated embodiment examples according to the invention are likewise possible. For example, an additional relay lens system can also be provided for transforming the focal point F' on the swiveling mirror 55 or integrating the expansion optics 55 in the compensation optics simultaneously.

While the foregoing description and drawings represent the preferred embodiments of the present invention, it will be obvious to those skilled in the art that various changes and modifications may be made therein without departing from the true spirit and scope of the present invention.

TABLE

| Location | Radius | Distance | Refractive Index | Dispersion v |
|---|---|---|---|---|
| 101 | | s = 50.0 mm | 1 (air) | |
| 102 | 8.66 mm | 2.6 mm | 1.622 | 63.2 |
| 103 | −19.69 mm | 0.7 mm | 1.761 | 27.3 |
| 104 | 5.09 mm | 2.5 mm | 1.622 | 63.2 |
| 105 | 58.14 mm | 29.3 mm | 1 (air) | |
| 106 | −29.85 | 2.5 mm | 1.4891 | 70.2 |
| 107 | 4.09 mm | 8.6 mm | 1 (air) | |
| 108 | −3878.1 mm | 2.7 mm | 1.812 | 25.2 |
| 109 | −11.36 mm | s' = 53.5 mm | 1 (air) | |
| 110 | | | 1 (air) | |

What is claimed is:

1. A device for the deflection of a total light bundle generated by a light source, said total light bundle having components with different wavelengths, comprising:

a nonmechanical deflection device for deflecting the total light bundle in dependence on a controlling variable, said nonmechanical deflection device having a wavelength-dependent deflection angle; and an optically dispersively active system being provided behind said nonmechanical deflection device in the light propagation direction;

said system having an angular dispersion dependent on the angles of the components of the total light bundle entering said system;

said angular dispersion compensating for the wavelength dependence of the deflection angle of the nonmechanical deflection device determined by the controlling variable wherein the light source has at least three lasers for generating at least three light bundles having different centroid wavelengths, said at least three light bundles are combined to form said total light bundle which exits collinearly from the light source, and wherein the optically dispersively active system is configured for a collinear total light bundle proceeding therefrom and for correcting with respect to the three centroid wavelengths, wherein the optically dispersively active system is a lens system with an input-side and an output-side focal point, wherein said light bundles traversing the input-side focal point also passes through the output-side focal point, and wherein the input-side focal point lies in the deflection point of the nonmechanical deflection device.

2. The device according to claim 1, wherein at least two of said light bundles exit from the lens system in an identical location of the final lens vertex depending on the controlling variable.

3. The device according to claim 2, wherein the lens system used as an optically dispersively active system is designed for increasing the deflection angle.

4. The device according to claim 3, wherein the lens system has compensation optics and has expansion optics which follow the latter and are corrected for chromatic aberrations.

5. The device according to claim 1, wherein said nonmechanical deflection device is an acousto-optic deflector.

6. The device according to claim 5, wherein the acousto-optic deflector is a Bragg cell.

7. The device according to claim 1, wherein the optically dispersively active system has an output-side focal point lying outside of the system, wherein the light bundles deflected by the nonmechanical deflection device traverse this focal point, and wherein another deflection device is arranged with a deflection point in this focal point, which further deflection device deflects in the direction vertical to the deflection caused by the nonmechanical deflection device.

8. The device according to claim 7, wherein the additional deflection device is a movable mirror.

9. The device according to claim 7, wherein expansion optics are arranged following the additional deflection device.

10. The device according to claim 1, wherein the nonmechanical deflection device is an individual acousto-optic deflector which is acted upon in two directions orthogonal to one another by sound waves for deflection in two directions.

11. A video system with a device for the deflection of a light bundle generated by a light source for the sequential illumination of image points of a video image, said light bundle having components with different wavelengths, said device for the deflection comprising a nonmechanical deflection device for deflecting the light bundle in dependence on a controlling variable, said nonmechanical deflection device having a wavelength-dependent deflection angle; and an optically dispersively active system being provided behind said nonmechanical deflection device In the light propagation direction;

said system having an angular dispersion dependent on the angles of the components of the light bundle entering said system;

said angular dispersion compensating for the wavelength dependence of the deflection angle of the nonmechanical deflection device determined by the controlling variable;

said video system comprising that the light source and the nonmechanical deflection device are connected to a control device by which the light source is controlled at every point in time with respect to the intensity and color of every image point, and that signals are supplied to said control device for controlling the deflection angle of said device for the deflection comprising an attenuation of intensity in dependence on the deflection angle, said signals being taken into account by said control device for controlling every image point with respect to correct color and intensity to compensate for this attenuation.

12. A device for the deflection of a light bundle generated by a light source comprising: a nonmechanical deflection device in which the light bundle enters and exits at a different angle determined by a controlling variable, which angle depends on the wavelength of every light component in the light bundle; and an optically dispersively active system being provided behind said nonmechanical deflection device in the light propagation direction;

said system having an angular dispersion dependent on the angle of the light bundle entering said system;

said angular dispersion compensating for the wavelength dependence of the angle of the nonmechanical deflection device determined by the controlling variable and wherein the optically dispersively active system has an output-side focal point lying outside of the system, wherein the light bundles deflected by the nonmechanical deflection device traverse this focal point, and wherein another deflection device is arranged with a deflection point in this focal point, which further deflection device deflects in the direction vertical to the deflection caused by the controlling variable wherein the optically dispersively active system has an output-side focal point lying outside of the system, wherein the light bundles deflected by the nonmechanical deflection device traverse this focal point, and wherein another deflection device is arranged with a deflection point in this focal point, which further deflection device deflects in the direction vertical to the deflection caused by the controlling variable.

* * * * *